US009373026B2

United States Patent
Kim et al.

(10) Patent No.: US 9,373,026 B2
(45) Date of Patent: Jun. 21, 2016

(54) METHOD AND SYSTEM FOR RECOGNIZING HAND GESTURE USING SELECTIVE ILLUMINATION

(71) Applicant: Hyundai Motor Company, Seoul (KR)

(72) Inventors: Sung Un Kim, Gyeonggi-Do (KR); Sihyun Joo, Seoul (KR)

(73) Assignee: Hyundai Motor Company, Seoul (KR)

( * ) Notice: Subject to any disclaimer, the term of this patent is extended or adjusted under 35 U.S.C. 154(b) by 273 days.

(21) Appl. No.: 14/134,691

(22) Filed: Dec. 19, 2013

(65) Prior Publication Data

US 2014/0185872 A1 Jul. 3, 2014

(30) Foreign Application Priority Data

Dec. 28, 2012 (KR) .................... 10-2012-0157478

(51) Int. Cl.
*G06K 9/00* (2006.01)
*G06T 5/00* (2006.01)
*G06K 9/20* (2006.01)

(52) U.S. Cl.
CPC .......... *G06K 9/00355* (2013.01); *G06K 9/2027* (2013.01); *G06T 5/002* (2013.01); *G06T 2207/10016* (2013.01); *G06T 2207/10048* (2013.01); *G06T 2207/20144* (2013.01)

(58) Field of Classification Search
CPC . G06K 9/00201; G06K 9/2018; H04N 7/185; G06T 2207/10016; G06T 2207/30196; G06T 7/2053; G06T 7/20
See application file for complete search history.

(56) References Cited

U.S. PATENT DOCUMENTS 5,987,154 A * 11/1999 Gibbon et al. ................ 382/115
6,810,135 B1 * 10/2004 Berenz et al. ................ 382/118
6,968,073 B1 * 11/2005 O'Boyle et al. .............. 382/104

(Continued)

FOREIGN PATENT DOCUMENTS

| KR | 10-0200876 | 3/1999 |
| KR | 10-0492765 B1 | 6/2005 |
| KR | 10-0537028 B | 12/2005 |
| KR | 10-0575504 B1 | 5/2006 |
| KR | 10-2012-0090630 | 8/2012 |

OTHER PUBLICATIONS

Maadi et al., Outdoor infrared video surveillance: A novel dynamic technique for the subtraction of a changing background of IR images, Infrared Physics & Technology 49 (2007), pp. 261-265.*

(Continued)

*Primary Examiner* — Vu Le
*Assistant Examiner* — Guillermo Rivera-Martinez
(74) *Attorney, Agent, or Firm* — Mintz Levin Cohn Ferris Glovsky and Popeo, P.C.; Peter F. Corless

(57) ABSTRACT

A method and system that recognize a hand gesture using selective illumination that can reliably perform hand gesture recognition by effectively removing an unnecessary image and noise including static disturbance light and dynamic disturbance light are provided. The method of recognizing a hand gesture includes acquiring, by a controller from an imaging device a hand image, which is a recognition target. A static background image and a dynamic background image are removed by the controller from the hand image. The method further includes recognizing, by the controller, a gesture of the hand by extracting a characteristic point from the hand image in which the dynamic background image is removed.

13 Claims, 5 Drawing Sheets

(56) References Cited

U.S. PATENT DOCUMENTS

| | | |
|---|---|---|
| 2005/0063564 A1 | 3/2005 | Yamamoto et al. |
| 2008/0051957 A1* | 2/2008 | Breed et al. ............. 701/36 |
| 2010/0208998 A1* | 8/2010 | Van Droogenbroeck et al. ............. 382/195 |
| 2012/0229646 A1* | 9/2012 | Grandidier et al. ........... 348/149 |
| 2013/0044912 A1* | 2/2013 | Kulkarni et al. ............. 382/103 |

OTHER PUBLICATIONS

Hassan et al., Real-time, Static and Dynamic Hand Gesture Recognition for Human-Computer Interaction, 2008, Electrical Engineering, University of Miami, Miami, FL, Electrical & Computer Engineering, Florida Insitute of Technology, Melbourne, FL, pp. 1-17.*

* cited by examiner

METHOD AND SYSTEM FOR RECOGNIZING HAND GESTURE USING SELECTIVE ILLUMINATION

CROSS-REFERENCE TO RELATED APPLICATION

This application claims priority to and the benefit of Korean Patent Application No. 10-2012-0157478 filed in the Korean Intellectual Property Office on Dec. 28, 2012, the entire contents of which are incorporated herein by reference.

BACKGROUND (a) Field of the Invention

The present invention relates to a method and system that recognize a hand gesture using selective illumination that can reliably perform hand gesture recognition by effectively removing an unnecessary image and noise including static disturbance light and dynamic disturbance light.

(b) Description of the Related Art

Nowadays, gesture recognition technology that recognizes (or detects) a hand gesture is applied to various fields (e.g., game, vehicle). A system that recognizes a hand gesture includes a hand recognition system that is based on color information, a shape based hand recognition system, and a three-dimensional information based hand recognition system.

The hand recognition system that is based on color information is a system that searches for colors such as a skin color within stored color information and recognizes a hand based on a size and a shape of the hand. The hand recognition system that is based on color information utilizes a simple recognition algorithm, however, the system is affected by a peripheral environment such as a varying skin colors from person to person and based on light change, and the system may not be used at night where color differentiation cannot be determined.

The shape based hand recognition system is a system that recognizes a hand, for example, through matching of a template from an existing database (DB) and an image. The shape based hand recognition system may require an increased number of templates, a calculation amount exponentially increases, and the shape based hand recognition system depends on a hand size as well as a hand shape.

The three-dimensional information based hand recognition system is an active research field and obtains a three-dimensional image using an imaging device, and recognizes a hand based on depth information. The three-dimensional information based hand recognition system can use three-dimensional information, however, the low cost competitive power of the system is affected by disturbance light and the system has an obstacle limitation between a user and an imaging device.

The hand recognition system described above is affected by an external light source, and a color and a shadow of an object are thus changed causing a probability that a recognition error may occur to increase.

The above information disclosed in this section is only for enhancement of understanding of the background of the invention and therefore it may contain information that does not form the prior art that is already known in this country to a person of ordinary skill in the art.

SUMMARY

The present invention provides a method and system that recognize a hand gesture using selective illumination having advantages of reliably recognizing a hand gesture by effectively removing an unnecessary image and noise including static disturbance light and dynamic disturbance light.

An exemplary embodiment of the present invention provides a method of recognizing a hand gesture that may include: acquiring a hand image, which is a recognition target; removing a static background image from the acquired hand image; removing a dynamic background image from the hand image in which the static background image is removed; and recognizing a gesture of the hand by extracting a characteristic point from the hand image in which the dynamic background image is removed.

The static background image may be static disturbance light of an external light source, and the dynamic background image may be dynamic disturbance light of an external light source.

Additionally, the acquiring of a hand image may include acquiring an image of the hand by performing on and off control of a lighting device every predetermined frame unit with a predetermined rule. The predetermined frame unit may be three frame units; the predetermined rule may turn on the lighting device in a first frame of the three frame units and turn off the lighting device in a second frame and a third frame of the three frame units.

An imaging device that is configured to acquire the image of the hand may be an infrared camera, and the lighting device may be an infrared lighting device.

Furthermore, the removing of a static background image may include acquiring a static disturbance light removal image by subtracting the second frame from the first frame. The removing of a dynamic background image may include acquiring a dynamic disturbance light image by subtracting the third frame from the second frame and acquiring a dynamic disturbance light removal image by removing the dynamic disturbance light image from the static disturbance light removal image based on the acquired dynamic disturbance light image.

Another embodiment of the present invention provides a system that recognizes a hand gesture including: an imaging device configured to acquire a hand image, which is a recognition target; a lighting device configured to illuminate light to allow the imaging device to acquire the image of the hand; and a gesture recognition unit configured to recognize the gesture of the hand by removing a static background image and a dynamic background image from the image of the hand that is acquired from the imaging device.

The gesture recognition unit may be executed by a controller that includes at least one microprocessor operating by a predetermined program or hardware including the microprocessor and the program may be formed with a series of commands that perform the method of recognizing a hand gesture.

As described above, according to an exemplary embodiment of the present invention, by effectively removing a static background image (e.g., disturbance light) and a dynamic background image (e.g., disturbance light) through an acquired hand gesture by performing on and off control of a lighting device every predetermined frame unit by a predetermined rule, a reliable hand gesture recognition may be performed.

DETAILED DESCRIPTION OF THE EMBODIMENTS

Figure 1:
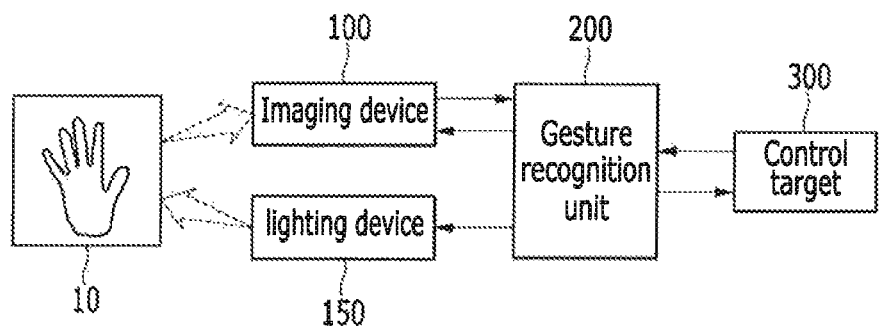
FIG. 1 is an exemplary schematic diagram of a hand gesture recognition system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Like reference numerals designate like elements throughout the specification.

FIG. 1 is an exemplary schematic diagram of a hand gesture recognition system according to an exemplary embodiment of the present invention. A hand gesture recognition system according to an exemplary embodiment of the present invention is a system that recognizes a hand gesture using a hand image acquired by an imaging device.

A hand gesture recognition system according to an exemplary embodiment of the present invention may include an imaging device (e.g., a camera) 100 configured to acquire a hand image 10, which is a recognition target; a lighting device 150 configured to illuminate the hand 10 to allow the imaging device 100 to acquire an image of the hand 10; and a gesture recognition unit 200 configured to generate a signal that controls a control target 300 by recognizing a gesture of the hand 10 by removing a static background image and a dynamic background image from the image of the hand 10 acquired from the imaging device 100.

In an exemplary embodiment of the present invention, the imaging device 100 is, for example, an infrared camera configured to effectively remove disturbance light of an external light source (e.g., street lamp, sun light), but it should be understood that the present invention is not limited thereto. In other words, when the imaging device 100 corresponds to the infrared camera, the present invention may be applied thereto.

In an exemplary embodiment of the present invention, the lighting device 150 may be for example, an infrared lighting device configured to generate lighting appropriate to the infrared camera, but it should be understood that the present invention is not limited thereto. In other words, when the lighting device 150 corresponds to an infrared lighting device, the present invention may be applied thereto.

The gesture recognition unit 200 may be executed by a controller that includes at least one microprocessor operating by a predetermined program or hardware including the microprocessor. The predetermined program may be formed with a series of commands that perform a method of recognizing a hand gesture according to an exemplary embodiment of the present invention to be described later.

Hereinafter, a method of recognizing a hand gesture according to an exemplary embodiment of the present invention will be described in detail with reference to the attached drawings.

Figure 2:
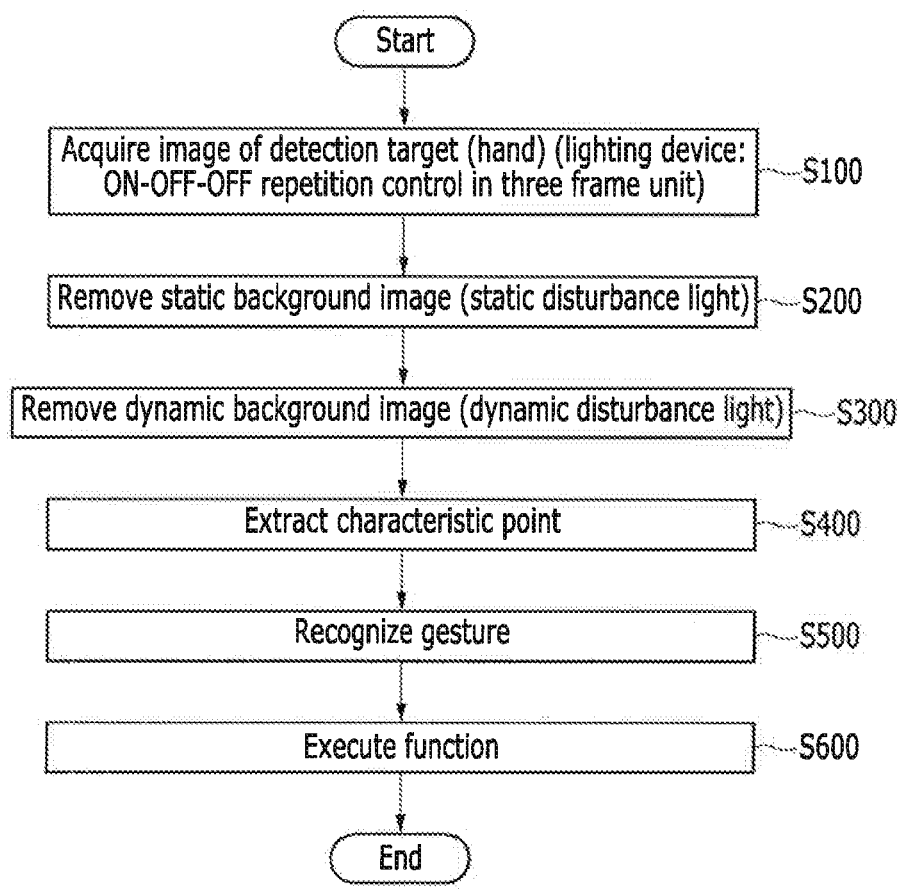
FIG. 2 is an exemplary flowchart illustrating a method of recognizing a hand gesture according to an exemplary embodiment of the present invention.

FIG. 2 is an exemplary flowchart illustrating a method of recognizing a hand gesture according to an exemplary embodiment of the present invention. As shown in FIG. 2, the gesture recognition unit 200 may be configured to acquire an image of the hand 10, which is a recognition target by operating the imaging device 100 and the lighting device 150 (S100). To acquire an image of the hand 10, the gesture recognition unit 200 may be configured to turn the lighting device 150 on and off every predetermined frame unit, for example, every 3 frames by a predetermined rule.

Figure 3:
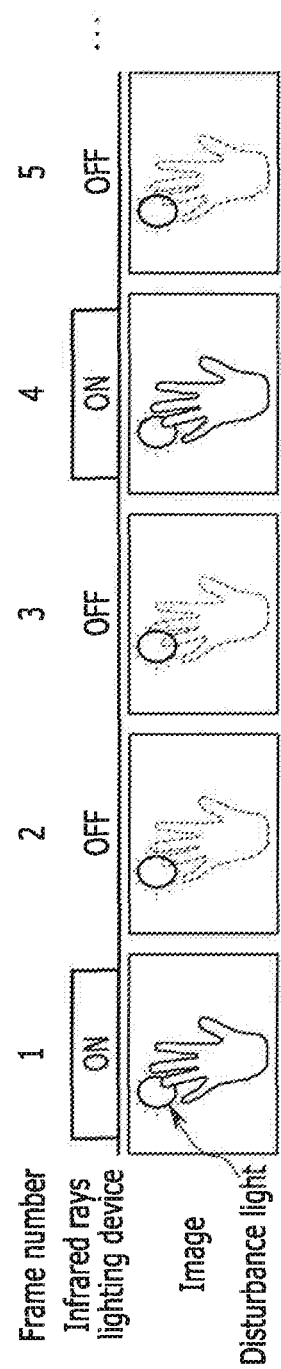
FIG. 3 is an exemplary diagram illustrating a process of turning on and off a lighting device every predetermined frame with a predetermined rule according to an exemplary embodiment of the present invention.

In an exemplary embodiment of the present invention, the predetermined rule is to, for example, turn on the lighting device 150 at the first frame of the three frames and turn off the lighting device 150 at second frame and third frames of the three frames, as shown in FIG. 3.

In FIG. 3, the 1 and 4 frames indicate that the lighting device 150 is turned on and the 2, 3, and 5 frames indicate that the lighting device 150 is turned off. Therefore, when the image of the hand 10 is acquired, to acquire only a pure gesture of the hand 10, the gesture recognition unit 200 may be configured to remove a static background image, more specifically, static disturbance light of an external light source (e.g., street lamp, sun light) (S200).

Figure 4:
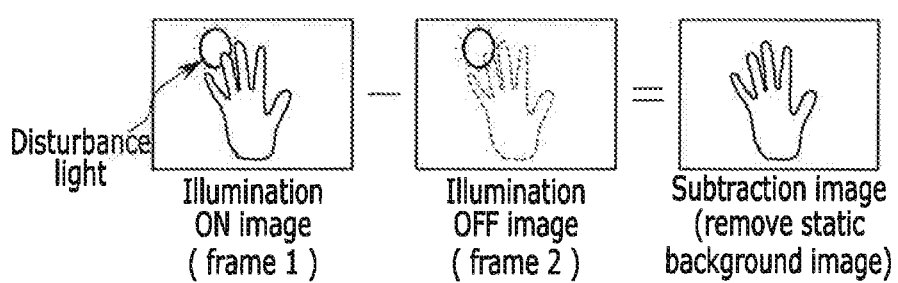
FIG. 4 is an exemplary diagram illustrating a process of removing a static background image (disturbance light) according to an exemplary embodiment of the present invention.

To remove the static disturbance light, the gesture recognition unit 200 may be configured to subtract the second frame from a first frame of the hand image, as shown in FIG. 4. In other words, the gesture recognition unit 200 may be configured to acquire a hand image in which a static background image (e.g., disturbance light) may be removed by subtracting the second frame from the first frame of the hand image, as shown in FIG. 4.

Figure 5:
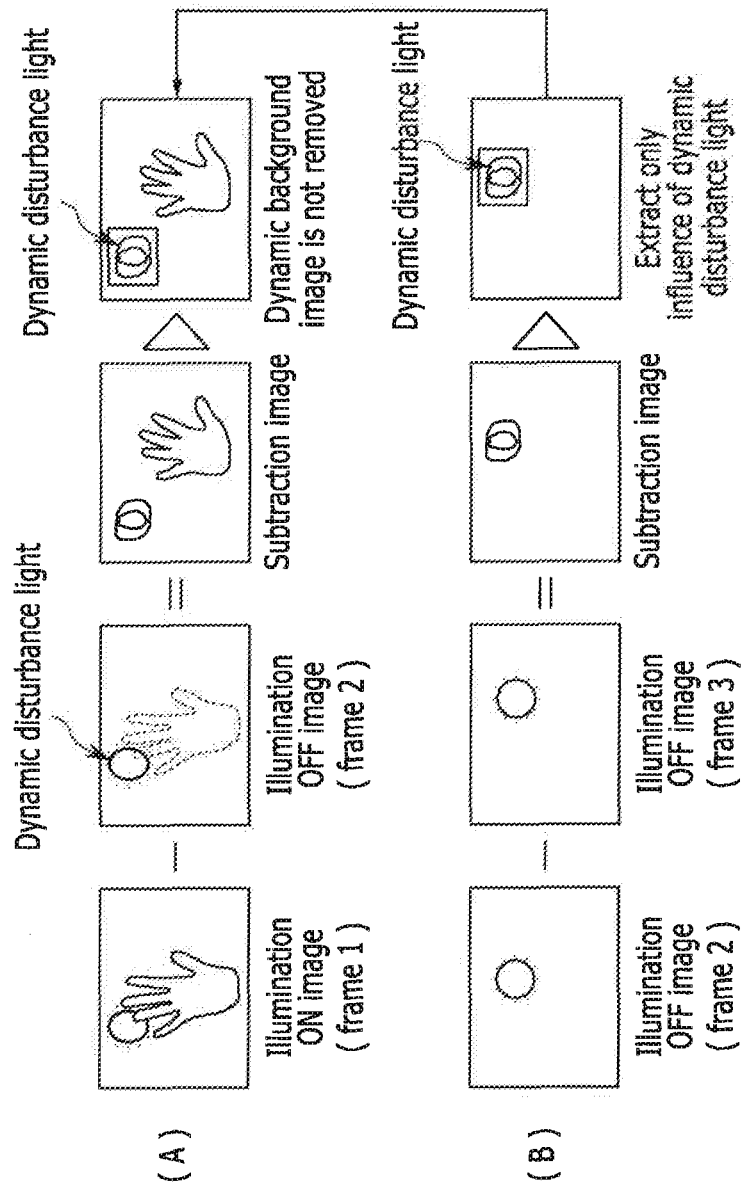
FIG. 5 is an exemplary diagram illustrating a process of removing a dynamic background image (disturbance light) according to an exemplary embodiment of the present invention.

When the static disturbance light is removed at step S200, in the hand image, a dynamic background image, more specifically, dynamic disturbance light of an external light source may not be removed, as shown in FIG. 5A. Therefore, the gesture recognition unit 200 may be configured to remove the dynamic disturbance light from a hand image in which the static disturbance light is removed (S300). In other words, as shown in FIG. 5B, the gesture recognition unit 200 may be configured to extract only an image (e.g., pattern) by an influence of dynamic disturbance light by subtracting the third frame from the second frame of the image of the hand 10.

When an image by an influence of the dynamic disturbance light is extracted, the gesture recognition unit 200 may be configured to remove dynamic disturbance light remaining in the hand image in which static disturbance light that is shown in FIG. 5A is removed using the extracted image by an influence of the dynamic disturbance light.

A method of removing dynamic disturbance light remaining in the hand image in which static disturbance light that is shown in FIG. 5A is removed using the extracted image by an influence of dynamic disturbance light may be performed through a general image removal technology.

When the image by an influence of dynamic disturbance light is removed from the hand image at step S300, the gesture recognition unit 200 may be configured to extract a characteristic point of the hand image using an existing method, recognize the hand gesture based on the extracted characteristic point, and generate a signal that executes a function of the control target 300 based on the recognized hand gesture (S400, S500, and S600).

Therefore, according to an exemplary embodiment of the present invention, by effectively removing a static background image (e.g., disturbance light) and a dynamic background image (e.g., disturbance light) through an acquired hand gesture by performing on and off control of a lighting device every predetermined frame unit by a predetermined rule, a reliable hand gesture may be recognized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| 10: recognition target (hand) | 100: imaging device |
| 150: lighting device | 200: gesture recognition unit |
| 300: control target | |

What is claimed is:

1. A method of recognizing a hand gesture, the method comprising:
    acquiring, by a controller from an imaging device, a hand image, wherein a hand in the hand image is a recognition target by performing on and off control of a lighting device every predetermined frame unit with a predetermined rule;
    removing, by the controller, a static background image from the acquired hand image by subtracting the hand image acquired when the lighting device is in an off-state from the hand image acquired when the lighting device is in an on-state;
    removing, by the controller, a dynamic background image acquired when the lighting device is in the off-state from the hand image in which the static background image is removed; and
    recognizing, by the controller, a gesture of the hand by extracting a characteristic point from the hand image in which the dynamic background image is removed,
    wherein the static background image is static disturbance light of an external light source and the dynamic background image is dynamic disturbance light of an external light source.

2. The method of claim 1, wherein the predetermined frame unit is three frame units, the predetermined rule turns on the lighting device in a first frame of the three frame units and turns off the lighting device in a second frame and a third frame of the three frame units.

3. The method of claim 2, wherein the imaging device that is configured to acquire the image of the hand is an infrared camera and the lighting device is an infrared lighting device.

4. The method of claim 3, wherein the removing of a static background image further comprises:
    acquiring, by the controller, a static disturbance light removal image by subtracting the second frame from the first frame.

5. The method of claim 4, wherein the removing of a dynamic background image further comprises:
    acquiring, by the controller, a dynamic disturbance light image by subtracting the third frame from the second frame; and
    acquiring, by the controller, a dynamic disturbance light removal image by removing the dynamic disturbance light image from the static disturbance light removal image based on the acquired dynamic disturbance light image.

6. A system that recognizes a hand gesture, the system comprising:
    an imaging device configured to acquire a hand image, which is a recognition target by performing on and off control of a lighting device every predetermined frame unit with a predetermined rule;
    a lighting device configured to illuminate light to allow the imaging device to acquire an image of the hand; and
    a controller configured to recognize the gesture of the hand by removing a static background image and a dynamic background image from the image of the hand acquired from the imaging device, wherein the controller is configured to:
        acquire from the imaging device a hand image, which is a recognition target;
        remove a static background image from the acquired hand image by subtracting the hand image acquired when the lighting device is in an off-state from the hand image acquired when the lighting device is in an on-state;
        remove a dynamic background image acquired when the lighting device is in the off-state from the hand image in which the static background image is removed; and recognize a gesture of the hand by extracting a characteristic point from the hand image in which the dynamic background image is removed, wherein the static background image is static disturbance light of an external light source and the dynamic background image is dynamic disturbance light of an external light source.

7. The system of claim 6, wherein the imaging device is an infrared camera and the lighting device is an infrared lighting device configured to illuminate infrared rays.

8. The system of claim 6, wherein the predetermined frame unit is three frame units, the predetermined rule turns on the lighting device in a first frame of the three frame units and turns off the lighting device in a second frame and a third frame of the three frame units.

9. The system of claim 6, wherein the controller is further configured to:

acquire a static disturbance light removal image by subtracting the second frame from the first frame.

10. The system of claim 9, wherein the controller is further configured to:

acquire a dynamic disturbance light image by subtracting the third frame from the second frame; and acquire a dynamic disturbance light removal image by removing the dynamic disturbance light image from the static disturbance light removal image based on the acquired dynamic disturbance light image.

11. A system that recognizes a hand gesture, the system comprising:

an imaging device configured to acquire a hand image, which is a recognition target by performing on and off control of a lighting device every predetermined frame unit with a predetermined rule;

a lighting device configured to illuminate light to allow the imaging device to acquire an image of the hand; and a controller configured to recognize the gesture of the hand by removing a static background image by subtracting the hand image acquired when the lighting device is in an off-state from the hand image acquired when the lighting device is in an on-state and a dynamic background image from the image of the hand acquired from the imaging device, wherein the controller is configured to:

acquire from the imaging device the hand image;

remove the dynamic background image acquired when the lighting device is in the off-state from the hand image in which the static background image is removed; and recognize the gesture of the hand by extracting a characteristic point from the hand image in which the dynamic background image is removed, wherein the static background image is static disturbance light of an external light source and the dynamic background image is dynamic disturbance light of an external light source.

12. A non-transitory computer readable medium containing program instructions executed by a processor or controller, the computer readable medium comprising:

program instructions that control an imaging device to acquire a hand image, which is a recognition target by performing on and off control of a lighting device every predetermined frame unit with a predetermined rule;

program instructions that control a lighting device configured to illuminate light to allow the imaging device to acquire an image of the hand;

program instructions that acquire from the imaging device a hand image, which is a recognition target;

program instructions that remove a static background image from the acquired hand image by subtracting the hand image acquired when the lighting device is in an off-state from the hand image acquired when the lighting device is in an on-state;

program instructions that remove a dynamic background image acquired when the lighting device is in the off-state from the hand image in which the static background image is removed; and program instructions that recognize a gesture of the hand by extracting a characteristic point from the hand image in which the dynamic background image is removed, wherein the static background image is static disturbance light of an external light source and the dynamic background image is dynamic disturbance light of an external light source.

13. The non-transitory computer readable medium of claim 12, wherein the predetermined frame unit is three frame units, the predetermined rule turns on the lighting device in a first frame of the three frame units and turns off the lighting device in a second frame and a third frame of the three frame units.

* * * * *